United States Patent Office
3,346,449
Patented Oct. 10, 1967

3,346,449
d-METHORPHAN COMPOSITIONS AND METHODS OF MAKING SAME
Louis Magid, Clifton, N.J., assignor to Hoffmann-La Roche Inc., Nutley, N.J., a corporation of New Jersey
No Drawing. Filed Sept. 27, 1963, Ser. No. 311,942
3 Claims. (Cl. 167—55)

This invention relates, in general, to novel products having therapeutic activity. More particularly, the invention relates to products having antitussive activity and to methods of producing and using such products.

d-3-methoxy-N-methylmorphinan and its conventional medicinally acceptable acid addition salts are well known in the art. This base, which will be referred to hereinafter simply as d-methorphan, and acid addition salts thereof have proven to be especially useful as the active ingredient in antitussive preparations.

In its broadest embodiment the present invention is concerned with the hereinafter-described novel d-methorphan reaction products.

In another embodiment the invention is concerned with d-methorphan reaction products which are substantially insoluble in water and which, in the form of a dry powder or in the form of an aqueous dispersion, are devoid of the bitter taste which characterizes d-methorphan, its conventional acid addition salts and usual oral dosage forms thereof.

In a more particular embodiment, the invention is concerned with d-methorphan reaction products which have antitussive activity which is prolonged in duration as compared to that of d-methorphan and its conventional acid addition salts.

In another embodiment the invention is concerned with a method of producing the d-methorphan reaction products of this invention and with the use of such reaction products as the active ingredient in pharmacetical preparations.

The novel antitussive agents of this invention are, in general, water-insoluble products produced by reacting an acid addition salt of d-methorphan with an acidic polymeric material of the type described hereinafter.

In the practice of this invention there can be used any conventional, water-soluble medicinally acceptable acid addition salt of d-methorphan. Thus, for example, salts of d-methorphan with medicinally acceptable inorganic acids, such as hydrobromic acid, hydrochloric acid, etc., can be used. Moreover, salts of d-methorphan with medicinally acceptable organic acids, such as citric acid, tartaric acid, benzoic acid, etc., can be used in the practice of this invention. However, d-methorphan hydrobromide, that is, the salt of d-methorphan with hydrobromic acid, is used in preparing the preferred products of the invention.

The acidic polymeric material which, in the practice of this invention is reacted with the acid addition salt of d-methorphan, is, broadly speaking, a water-soluble carboxy vinyl polymer, or some other cation exchange polymer containing functional carboxyl groups as an integral portion of the polymer molecule. The carboxyl groups of such polymers can be free or they can be partially or completely neutralized with a suitable cation. Suitable for use in producing the present products are water-soluble resins which have varying degrees of cross-linking between the polymer chains as well as water-soluble resins having little or no cross-linking. Representative of the polymers which can be used in the production of the products of this invention are those prepared as described in U.S. Patents 2,798,053 and 2,909,462. The polymeric material which is used as a reactant in preparing the preferred products of this invention is, however, an acid carboxy vinyl polymer of acrylic acid, copolymerized with from about 0.75% to about 2.0% by weight of polyallyl sucrose. A polymer of this type is sold by B. F. Goodrich Chemical Company under the trade name "Carbopol 934." It has been found that products produced by reacting an acid addition salt of d-methorphan with Carbopol 934 have especially valuable properties. Hence, Carbopol 934 is used as the acidic polymeric reactant in the preferred embodiment of this invention.

The products of this invention are readily obtained. Broadly speaking, the desired products can be prepared simply by reacting the acid addition salt of d-methorphan with the polymeric material in the presence of water. In carrying out this invention, there is used from about 0.25 part to about 15.0 parts by weight of the polymeric reactant for each part by weight of d-methorphan acid addition salt used. In the preferred embodiment of the invention, however, from about 3.0 parts to about 15.0 parts by weight of polymeric reactant is used for each part by weight of d-methorphan acid addition salt employed.

While it is necessary that water be present in the presently disclosed reaction, the quantity of water which is used in the production of the present products is, however, not especially critical. For example, the reaction can be effected, and the desired products obtained, in the presence of a quantity of water sufficient to provide a completely wetted paste-like reaction mass. Greater quantities of water can be used if desired. Thus, for example, the reaction can be effected in a quantity of water sufficient to provide a solution of the reactants. In the preferred practice of the invention, an aqueous solution containing up to about 6% by weight of the polymeric material and an aqueous solution containing up to about 2% by weight of the acid addition salt of d-methorphan is, in fact, employed.

The reaction of the d-methorphan acid addition salt with the polymeric material is effected simply by mixing one reactant with the other in the presence of water. For example, the reaction can be carried out by adding the d-methorphan acid addition salt, in the form of a solution, to an aqueous solution of the polymeric reactant and mixing same at a temperature within the range of from about room temperature to about 90° C. In an alternate method, the aqueous solution of the polymeric reactant is added to the aqueous solution of the d-methorphan acid addition salt and mixed therein at a temperature within the range of from about room temperature to about 90° C. In another preparative method, the polymeric reactant and the acid addition salt of d-methorphan are admixed in a dry state, following which the mixture is completely wetted with water. The wetted reaction mixture is then mixed, and the desired reaction thus effected, at a temperature between about room temperature and 90° C. In all of the various methods, however, it is preferred to carry out the reaction at a temperature within the range of from room temperature to about 50° C.

The water-insoluble products which are obtained as described in the preceding paragraphs can be worked up, for example, by filtration and subsequent drying or, where filtration is impractical, by merely drying, to provide dry, powdery materials. These powders are suitable for use in the production of the various liquid or solid oral dosage forms in which antitussive preparations are normally provided. Thus, for example, while the products of this invention are water-insoluble, they are readily dispersible in aqueous vehicles. As such, the products can be dispersed or suspended in pharmaceutically acceptable liquids or syrups. Moreover, the dry products are completely suitable for use in the preparation of tablets, lozenges, candies, etc. Moreover, the reaction products, in the dispersed form in which they are obtained in the preferred preparative method, can be used directly, that is, without first separating same from water, in formulating liquid pharmaceutical preparations.

The manner in which the presently disclosed products are formulated into suitable pharmaceutical preparations will be readily apparent to persons skilled in the art. In general, any of the procedures or techniques known in the art can be employed in the formulation of oral dosage forms containing the present products. The various optional ingredients which are used normally in the formulation of tablets, lozenges, suspensions, etc., can be used in formulating the present products into marketable, pharmaceutical preparations. For example, any of the well-known coloring agents, sweetening agents, flavoring agents, etc., can be used in the production of such preparations. Moreover, these preparations can contain adjuvants, either organic or inorganic in nature, such as gelatin, starch, magnesium stearate, talc, vegetable oils, gums, polyalkylene glycols, preservatives, stabilizers, wetting or emulsifying agents, salts for altering osmotic pressure, buffers, etc.

The reaction products disclosed herein can be present in the foregoing formulations as the sole therapeutically active ingredient thereof. If desired, however, the present products can be used in admixture with other therapeutically active compounds. For example, the products of this invention can be used in combination with a decongestant such as phenylephedrine hydrochloride, desoxyephedrine hydrochloride, etc., and/or in combination with an analgesic, such as p-ethoxyacetanilide, n-acetyl-p-aminophenol, salicylamine, and/or in combination with an antihistamine, such as chlorpheniramine, phenindamine, etc. It is to be understood, however, that the specific decongestants, analgesics and antihistamines heretofore named, have been mentioned herein by way of example only. In general, the products of this invention can be used in admixture with any therapeutically active compound which, in the past, has been present either in a d-methorphan- or in a d-methorphan acid addition salt-containing preparation.

As has been indicated heretofore, the products of this invention differ from the conventional acid addition salts of d-methorphan in that they are water-insoluble compounds. Moreover, the present products differ from conventional acid addition salts of d-methorphan in other respects also. Thus, for example, it is well known that d-methorphan and its conventional acid addition salts are characterized by a bitter and rather unpleasant taste. The products of the present invention are essentially tasteless and, hence, pharmaceutical preparations containing these products do not have the residual bad taste which is often found in d-methorphan containing preparations. Furthermore, the present products, when embodied in conventional oral dosage forms, have been found to possess sustained release antitussive characteristics. By this it is meant that the duration of activity of the presently disclosed products is substantially prolonged as compared to that of d-methorphan and its acid addition salts. The foregoing notwithstanding, however, there is little, if any, difference between the therapeutic effectiveness of conventional d-methorphan acid addition salts and the present products. Despite the fact that, in the practice of this invention, the acid addition salt of d-methorphan is reacted with a relatively high molecular weight polymeric material to provide a tasteless, water-insoluble compound, it has been established definitely that, under physiological conditions, d-methorphan is liberated from the reaction product to provide the desired antitussive relief.

For a fuller understanding of the nature and objects of this invention, reference may be had to the following examples which are given merely as further illustrations of the invention and are not to be construed in a limiting sense. All parts given in the examples are parts by weight unless otherwise indicated.

Example 1

In this example, 3.0 grams of d-methorphan hydrobromide were dissolved, at room temperature, in 250 cc. of water. Concurrently therewith, 20.0 grams of Carbopol 934 were dissolved at room temperature in 750 cc. of water. Thereafter, at room temperature, the aqueous solution of d-methorphan hydrobromide was added, in small portions, to the aqueous solution of Carbopol 934 with continuous stirring.

There was obtained by this method a cloudy dispersion of the water-insoluble reaction product in water. The product, thus produced, was therapeutically active and devoid of any bitter taste.

The dispersion, containing the equivalent of 15 mg. of d-methorphan hydrobromide per 5 cc., was tasteless. The antitussive properties of the dispersed product were tested, orally, at a dosage level of 10 mg./kg. The product was found to have sustained antitussive activity.

Example 2

In this example, 3.0 grams of d-methorphan hydrobromide were dissolved, at room temperature, in 250 cc. of water. In a separate vessel, 1.3 grams of Carbopol 934 were dissolved, at room temperature, in 750 cc. of water. Thereafter, at room temperature, the aqueous solution of d-methorphan hydrobromide was added slowly to the aqueous solution of Carbopol 934. The addition was carried out with continuous stirring.

The product, thus obtained, was a cloudy dispersion of the water-insoluble reaction product in water. The dispersion, containing the equivalent of 15 mg. of d-methorphan hydrobromide per 5 cc., was devoid of any bitter taste and the reaction product therein proved to be active as an antitussive agent. The antitussive properties of the product were tested orally at a dosage level of 10 mg./kg. The product was found to have antitussive activity which was sustained in duration.

Example 3

In this example, 3.0 grams of d-methorphan hydrobromide were dissolved, at room temperature, in 250 cc. of water. Concurrently therewith, 2.6 grams of Carbopol 934 were dissolved, at room temperature, in 750 cc. of water. Thereafter, the aqueous solution of d-methorphan hydrobromide was added slowly to the aqueous solution of Carbopol 934 with continuous stirring. During the mixing operation, the mixture was maintained at room temperature.

There was obtained by this procedure a cloudy dispersion of the water-insoluble reaction product in water. This dispersion, containing the equivalent of 15 mg. of d-methorphan hydrobromide per 5 cc., was devoid of the bitter taste which ordinarily characterizes aqueous dispersions of d-methorphan hydrobromide. The dispersed product was found to be therapeutically active as an antitussive agent at a dosage level of 10 mg./kg. The product was found to have sustained antitussive activity.

Example 4

In this example, separate solutions of 10.0 grams of Carbopol 934 in 750 cc. of water and 3.0 grams of d-methorphan hydrobromide in 250 cc. of water were first prepared. Thereafter, at room temperature, the aqueous solution of d-methorphan hydrobromide was added in small portions to the aqueous solution of Carbopol 934. During the addition the mixture was continuously stirred.

There was obtained by this method a cloudy dispersion of the water-insoluble reaction product in water. This dispersion, containing the equivalent of 15 mg. of d-methorphan hydrobromide per 5 cc., was completely devoid of the bitter taste ordinarily characterizing aqueous dispersions of d-methorphan hydrobromide. Moreover, the dispersion tested orally at a dosage level of 10 mg./kg. proved to have sustained antitussive activity.

Example 5

In this example, 3.0 grams of d-methorphan hydrobromide were dissolved, at room temperature, in 250 cc. of water. In a separate vessel, 40.0 grams of Carbopol 934 were dissolved, at room temperature, in 750 cc. of water. Subsequently, at room temperature, the aqueous solution of d-methorphan hydrobromide was added slowly to the aqueous solution of Carbopol 934 with continuous stirring.

A cloudy dispersion of the water-insoluble reaction product in water was thus obtained. This product, containing the equivalent of 15 mg. of d-methorphan hydrobromide per 5 cc., was devoid of bitter taste and when tested orally at a dosage level of 10 mg./kg. It was found to have sustained antitussive activity.

I claim:

1. A therapeutically active composition produced by mixing, in the presence of water, (1) a water-soluble salt of d-methorphan with a medicinally acceptable acid and (2) a water-soluble acid carboxyvinyl polymer of acrylic acid, copolymerized with from about 0.75% to about 2.0% by weight of polyalkyl sucrose.

2. A therapeutically active composition produced by (1) adding an aqueous solution of a water-soluble salt of d-methorphan with a medicinally acceptable acid to an aqueous solution of acid carboxyvinyl polymer of acrylic acid, copolymerized with from about 0.75% to about 2.0% by weight of polyalkyl sucrose and (2) mixing the aqueous mixture, thus obtained, at a temperature within the range of from about room temperature to 90° C.

3. A pharmaceutical preparation, in oral unit dosage form, comprising (1) medicinally acceptable adjuvant materials and (2) a product produced by reacting (a) a water-soluble salt of d-methorphan with a medicinally acceptable acid with (b) a water-soluble acid carboxyvinyl polymer of acrylic acid, copolymerized with from about 0.75% to about 2.0% by weight of polyalkyl sucrose.

References Cited

UNITED STATES PATENTS

| | | | |
|---|---|---|---|
| 3,085,942 | 4/1963 | Magid | 167—67 |
| 3,248,290 | 4/1966 | Zentner | 167—55 |

OTHER REFERENCES

Carbopol: 934, March 1954, pp. 1, 11.

Swafford et al.: J.A.P.A. (Practical) vol. 16, March 1955.

SAM ROSEN, *Primary Examiner.*